United States Patent [19]

Nestel et al.

[11] Patent Number: 4,625,108

[45] Date of Patent: Nov. 25, 1986

[54] DEVICE FOR DETERMINING THE DIRECTION OF INCIDENT OPTICAL RADIATION

[75] Inventors: Siegfried Nestel; Manfred Böhm, both of Stuttgart, Fed. Rep. of Germany

[73] Assignee: International Standard Electric Corporation, New York, N.Y.

[21] Appl. No.: 566,248

[22] Filed: Dec. 28, 1983

[30] Foreign Application Priority Data

Jan. 13, 1983 [DE] Fed. Rep. of Germany ....... 3300849

[51] Int. Cl.$^4$ ............................................. G01B 11/26
[52] U.S. Cl. .................................. 250/227; 250/226; 356/141; 356/152
[58] Field of Search .............. 250/227, 578, 226, 203; 356/141, 152; 455/610, 612; 244/3.16

[56] References Cited

U.S. PATENT DOCUMENTS 3,953,131  4/1976  Britz .................................... 250/227
4,127,773  11/1978  West .................................... 250/226

FOREIGN PATENT DOCUMENTS 1083338  8/1980  Canada .

*Primary Examiner*—Edward P. Westin
*Attorney, Agent, or Firm*—T. L. Peterson; J. S. Christopher

[57] ABSTRACT

In a sensor head (1), hemispherical in form, a plurality of optical fibers (4) is uniformly distributed over the convexly arched surface area (3), and mounted therein. The other ends of the optical fibers (4) are gathered into a bundle (6) whose end face opposes a detector matrix (8) comprising a plurality of detectors. By a subsequently arranged evaluating circuit, and by assigning the detectors to the individual optical fibers (4), there is determined the direction and, by summing up the individual charges of the detectors, there is also recognized the intensity of the incident radiation.

Some additional bundles (15) of optical fibers (16) are disposed by being distributed among the optical fibers (4). From each such bundle (15), an equal number of optical fibers (16) is led to each of several detectors (17). These detectors (17) are provided with individual filters (18, 19, 20) or a common filter (23) having certain wavelength responsive regions. From a signal detected by one of the detectors (17), a subsequently following evaluating circuit contemporaneously recognizes the wavelength of the source of radiation.

7 Claims, 6 Drawing Figures

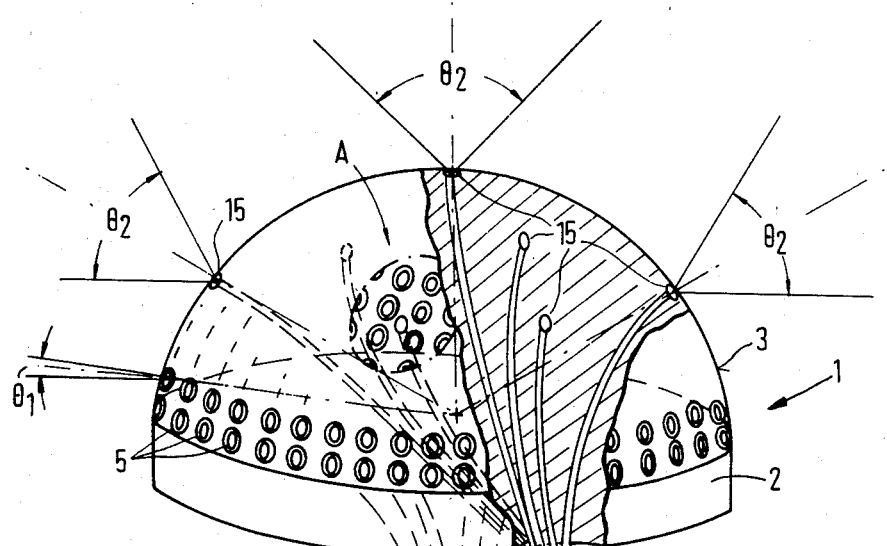
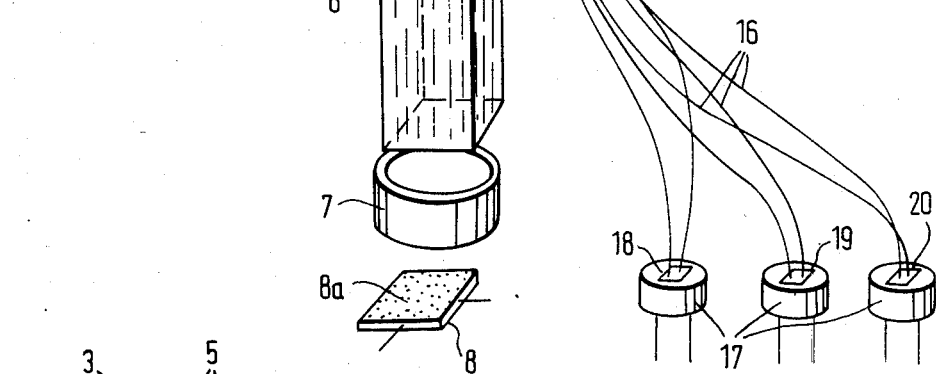
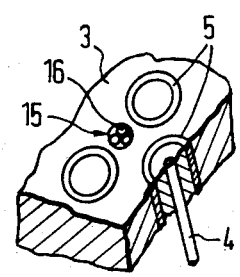

DEVICE FOR DETERMINING THE DIRECTION OF INCIDENT OPTICAL RADIATION

BACKGROUND OF THE INVENTION

1. FIELD OF THE INVENTION

The invention relates to passive optical radiation direction finding generally, and more specifically to such devices operative on substantially a single burst of optical energy to determine angle of incidence and wavelength of the received optical radiation.

2. DESCRIPTION OF THE PRIOR ART

In the prior art optical direction finding has been accomplished variously. One particular prior art device, according to German patent No. DE-OS 25 11 016, utilizes a battery of objective lenses distributed about a convex surface, each lens having its optical axis directed at a different angle. The received ray bundles are redirected via mirrors or prisms onto an image plane and projected therefrom via additional lens systems to individual optical detectors. The spatial angle covered by each of said objective lenses is relatively large and, accordingly, only an approximate angular determination of received radiation is achieved. Moreover, the mechanical construction of such a device is expensive in view of the complex optics and the large duplication of amplifiers and multiplexers required.

The manner in which the invention addresses the problem, resulting in a highly advantageous arrangement, will be understood as this description proceeds.

SUMMARY OF THE INVENTION

In consideration of the typical prior art approach to optical direction finding, the general object of the invention may be said to have been the provision of a relatively inexpensive apparatus having greater angular accuracy and having the additional capability of wavelength determination. These determinations are possible on a single, short duration pulse of optical energy.

The apparatus of the combination is light in weight, passive (having no moving parts) and is therefore easily used and transported. A sensor head, normally hemispherical in form, has the first ends of a plurality of first optical fibers apertured outwardly therefrom, these being distributed uniformly about the hemispherical or convexly arched surface. The second ends of said fibers are arranged to illuminate separate detectors (light-to-electric transducers) or, alternatively, to illuminate a detector CCD matrix (integrated charge coupled device arranged as a matrix photodetector). Electronic processing circuits determine direction of radiation and also intensity.

Additional optic fiber bundles of somewhat wider angular aperture characteristic are distributed among the first optical fiber locations and are associated with additional detectors and associated optical filters for contemporaneous wavelength determination.

BRIEF DESCRIPTION OF THE DRAWINGS

FIG. 1 shows a sensor head and related apparatus for determining the direction and intensity of incident light rays according to a first, and partially to a second, wavelength determining embodiment.

FIG. 2 shows a detail of partial area A as shown in FIG. 1, on an enlarged scale.

DETAILED DESCRIPTION OF THE PREFERRED EMBODIMENT

Figure 3:
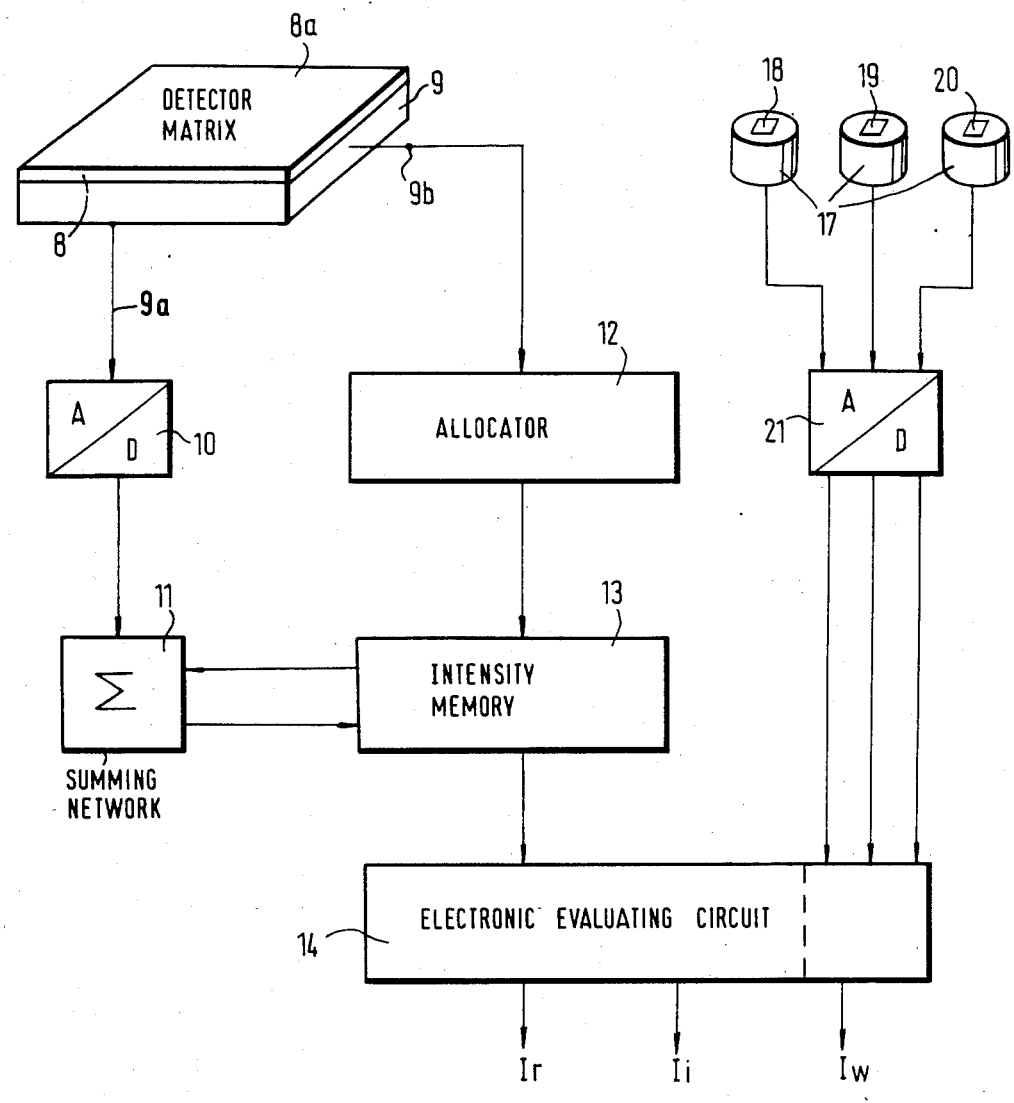
FIG. 3 shows the block diagram of the evaluating circuit.

Referring to FIG. 1, sensor head 1 is shown generally. Above an annular plate 2, a body shell 3 having a hemispherical outer surface is placed. A plurality of optical fibers 4 with their first ends apertured outward are distributed substantially uniformly throughout the surface of shell 3. For the sake of clarity, only two annularly arranged rows are shown, as well as partial area A from which the distribution over the entire surface can be extrapolated. The optical fibers 4 are terminated in lens caps 5 (FIG. 2), these being radially aligned and embedded in the sensor body. They serve to restrict the optical coverage angle $\theta_1$ of each individual fiber to a desired width. The spaced relation of the optical fibers 4 is chosen such that their optical coverage angles $\theta_1$ overlap each other to such an extent that no dead space angles exist.

All of the optical fibers 4 are led out downwardly through a non-visible recess in the annular plate 2 and are incoherently gathered into a bundle 6. The cross sectional shape of the bundle 6 is adapted to that of the detector surface $8a$ of a detector matrix 8. Between the ground and polished end face of the bundle 6 and the detector matrix 8, an optical system 7 is provided. This optical system may be, for example, a columnating lens, a Fresnel lens, or may consist of rod-shaped individual lenses which are placed next to each other in a honeycomb manner. This optical system serves to focus the radiation as emerging from the second ends of optical fibers 4 of the bundle 6, on the detector surface $8a$. It is possible to dispense with optical system 7, particularly when using optical fibers having narrow radiation angles, and by placing the second ends thereof in close proximity to the detector surface.

The detector matrix 8 comprises n detector elements, with n being considerably greater than the number m of the optical fibers 4. From this, it follows that the light of each individual optical fiber 4 can impinge on a plurality of adjacent detector elements. Accordingly, each optical fiber need not be exactly aligned to a corresponding detector element. Alternatively, in the special case m = n, when exactly positioning the optical fibers (e.g. with the aid of a mount), a single corresponding detector element can be used per optical fiber. The detector matrix 8 represents the interface to the evaluating circuit shown in FIG. 3. Constituent parts of the matrix 8 are charge-coupled shift registers 9 connected to the detector elements. The shift registers 9, which are clocked by an electronic evaluating circuit 14, have an output $9a$ on which the charge-condition values of the cyclically interrogated detector elements are fed out in series. Via an analog-to-digital converter 10, the signals are applied to a summing network 11. To a clocked output $9b$, there is connected an allocator 12 which is a programmable read-only memory having a number of memory locations corresponding to the number of detector elements of the matrix 8.

In the course of manufacture of the device, this memory 12 is programmed in such a way that it can be determined from which optical fiber a particular detector element receives the corresponding optical fiber light. For blocking out bordering zones, a threshold circuit therein serves to disregard those memory locations whose associated detector elements provide a minimum signal.

To the output of the allocator 12, there is connected an intensity memory 13. This memory 13 is a variable memory comprising m memory locations. In the called-up state, the correspondingly addressed memory locations are in an information exchange with the summing network 11, The output of the intensity memory 13 is connected to the input of an electronic evaluating circuit 14.

An incident radiation is overlappingly detected as well by adjacent optical fibers. In this way there is provided the possibility of electronic direction interpolation for the purpose of increasing the direction accuracy.

Via the optical fibers 4 and the interface optics 7, the received radiations are projected onto the detector surface 8a of the detector matrix. In this way all detector elements are energized which are illuminated by the optical fibers 4. The time of energization of the detector elements is equal to the pulse length of the radiation. This time may be smaller than 40 nsec. At periodic time intervals there is effected a row-wise interrogation of all detector elements of the matrix 8 via the shift registers 9. From the analog output 9a, the charge-condition values of the detector elements as interrogated one at a time in turn, are fed to the analog-to-digital converter 10 and, thereafter, to the summing network 11. Parallel in relation thereto, and in the same clock cadence, the allocator 12 is controlled via the output 9b. This allocator 12, in the order of sequence of the output of the detector's charge conditions, transmits to the summing network 11 the respective number of the optical fiber for serving as an address on the intensity memory 13. Following the selection of a memory location and in cases where the number of detector elements n exceeds the number of fibers m, the old content of the respective memory location is fed to the summing network 11, and the sum is formed of both the old content and the present charge value, to be returned as a new value into the memory 13. At the end of the interrogation cycle of the detector matrix 8, the memory 13, under the respective number of optical fibers transmitting an optical radiation, contains values which are a measure of the respectively received radiation. In the electronic evaluating circuit 14, there is then effected the allocation of the optical fibers according to their orientation in both the azimuth and the elevation. Accordingly, by interrogating the memory 13 it is possible to exactly determine the direction of incidence of the received optical radiation. The respective intensity of the radiation is indicated by the charge values. Via outputs Ir and Ii both the direction and intensity information is forwarded in a processed form to be either further evaluated or displayed. The intensity is a function of the distance of the source of radiation from the sensor head and therefore indicative of distance.

In order to obtain a greater light yield per channel, each of the optical channels may consist of several optical fibers 4 which are then jointly mounted in one lens cap 5.

With the aid of the device according to the invention, it is possible to monitor the half space within an angular range of 360° in the azimuth and 180° in the elevation uninterruptedly with respect to optical radiation, with it being possible to accurately determine the direction and the intensity of the detected optical radiation. This is chiefly of importance in the case of a constricted radiation, such as that of a laser beam.

In the following there will be described two advantageous further embodiments of the invention with the aid of which, together with the direction determination, it is also possible to recognize the wavelength of the received radiation.

In the first further embodiment, as can be seen from FIGS. 1 and 2, further optical fibers 16 which are gathered into bundles 15 are uniformly distributed over the surface 3. As can be seen from the partial surface area A and the enlarged detail as shown in FIG. 2, the optical fiber bundles 15 are arranged between the optical fibers 4. The space coverage angles of the optical fiber bundles 15 are somewhat greater than $\theta_1$, and are indicated by the reference $\theta_2$. These angles are typically chosen so that six optical fiber bundles 15 disposed at about half the height (elevation angle) of the surface area 3 and also at the zenith, cover the entire half space. The other ends of the optical fiber bundles 15 are led out to the side of the bundle 6 as seen in FIG. 1. The individual fibers of the bundles are connected to three detectors 17 in the way to be described hereinafter. The number of optical fibers groups 16 each having fiber bundles 15 is equal to the number of detectors 17. Accordingly, in the present example, each bundle 15 consists of three optical fibers 16 (FIG. 2), each of which is led to one of the detectors 17. These detectors 17 are preceded by filters 18, 19 and 20 for certain wavelength regions. The outputs of the detectors 17, as shown in FIG. 3, are led separately via an analog-to-digital converter 21 to the electronic evaluating circuit 14.

Radiation incident from any optional direction is thus not only detected by the optical fibers 4, but also by one or more optical fiber bundles 15. When the wavelength of the radiation is within the pass range of one of the filters 18, 19, 20, it is checked in the electronic evaluating circuit 14 to determine if one of the optical fibers 4 has contemporaneously detected a radiation indicative of the direction. In that case the information concerning the wavelength of the detected radiation appears at the output Iw for further evaluation or display.

Figure 4:
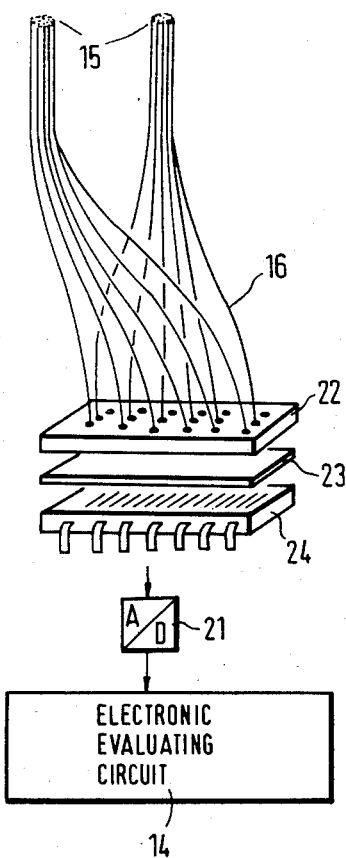
FIG. 4 shows a second embodiment for determining wavelength.

In the second further embodiment as shown in FIG. 4, the optical fibers 16 which are gathered into bundles 15 are fixed at their ends in a row-wise manner, equally spaced, in the longitudinal direction of a socket 22, with the first bundle occupying the first row. The next bundle of optical fibers occupies with its optical fibers the next row of the socket, etc. The number of rows corresponds to the number of bundles 15, and the number of plug-in positions of one row corresponds to the number of optical fibers 16 per bundle.

Figure 5:
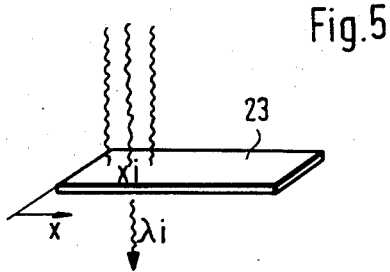
FIG. 5 shows a schematic representation for explaining the mode of operation of the embodiment of FIG. 4.
Figure 6:
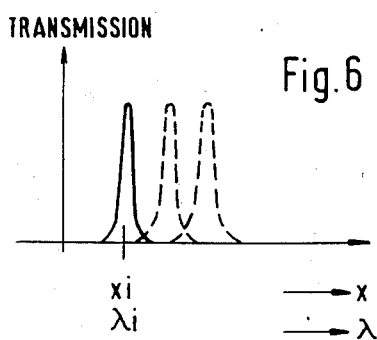
FIG. 6 depicts waveforms relating to the operation of the arrangement of FIG. 4.

The radiation emergent from the optical fibers via the throughholes of the socket 22 is directed onto an optical band-pass wedge filter 23. This optical band-pass wedge filter is an interference filter which is coated wedge-shapedly, with the transmission thereof being equal to that of several adjacent, narrow optical band-pass filters, with the position X thereof being respectively associated with a defined pass range $\lambda i$, i.e. in such a way that from this there will result a linear curve of the entire pass range, as is shown in FIGS. 5 and 6. The optical band-pass wedge filter permits the passage of radiation having a discrete wavelength $\lambda i$, substantially only at one single position $x_i$; all surrounding positions $x_i + \Delta x$ outside the narrow pass range prevent the passage of the wavelength $\lambda_i$.

When optical radiation (such as laser radiation) with radiation components of the discrete wavelengths $\lambda_1$, $\lambda_2$, $\lambda_3$, . . . , is detected by one or more of the optical fiber bundles 15, there will exist associated positions $x_1$, $x_2$, $x_3$, . . . , at which the optical band-pass wedge filter has a transmission band. At all of these positions, the transducers of an optical-electrical row detector 24 are irradiated. By interrogating the detector elements, the positions $x_1$, $x_2$, $x_3$. . . , can be determined. In this way also the incoherent wavelengths $\lambda_1$, $\lambda_2$, $\lambda_3$, . . . are known, which can be taken from a table of a data storage in the electronic evaluating circuit 14 (corresponding to the example shown in FIG. 3).

It is one advantage of the device as shown in FIG. 4 that with the aid of one single integrated optical-electrical detector, several simultaneously appearing spectral elements can be detected, which may result either from one single source of radiation or from several separated sources of radiation. In the electronic evaluating circuit, the information concerning the wavelength can again be assigned the exact direction of each source of radiation as in the case of the first further embodiment.

What is claimed is:

1. An apparatus for passively determining direction of incident optic radiation comprising:
   mounting means for providing a convex surface;
   a plurality of optical fibers each having a first and second end, said first ends of said optical fibers disposed within said mounting means and apertured outwardly toward said convex surface, said plurality of optical fibers incoherently gathered into a bundle, said bundle of gathered optical fibers disposing said second ends of said plurality of optical fibers into a planar surface having a predetermined cross-sectional shape;
   a detector matrix comprising a plurality of detector elements, the number of said detector elements being at least as great as the number of optical fibers included within said plurality of optical fibers, said second ends of said optical fibers and said plurality of detector elements of said detector matrix disposed with respect to each other in a nonaligned optically communicating relationship wherein optical radiation emitted from said second ends of said plurality of optical fibers is directed toward said plurality of detector elements comprising said detector matrix in a nonaligned mapping between said optical fibers on one hand and said detector elements of said detector matrix on the other;
   allocator memory means for uniquely identifying said mapping between said optical fibers and said detector elements, said allocator memory means generating a unique address corresponding to each detector element and signifying a direction in space corresponding to that optical fiber which is in optical communication with said corresponding detector element;
   summing network means for selectively determining said output intensity of each of said detector elements within said detector matrix;
   an intensity memory means, having a plurality of memory locations, for selectively storing said intensity output corresponding to each detector element within said detector matrix within one of said plurality of memory locations within said intensity memory means according to said address generated by said allocator memory means, said intensity memory means being coupled to said allocator memory means and to said summing network means; and
   evaluating circuit means coupled to said intensity memory means for processing said intensity output stored within said intensity memory means and for generating an output corresponding to said direction of said incident optical radiation,
   whereby said apparatus for passive optical radiation detection is provided without complex optical systems, without a plurality of individual optical detectors, without complex mechanical construction, and without large duplication of circuit elements.

2. The apparatus of claim 1 wherein said detector matrix comprises a charged coupled device.

3. The apparatus of claim 1 further comprising:
   a second plurality of optical fibers disposed in said mounting means, said second plurality optical fibers each having a first and second end, said first end being selectively disposed about said convex surface among said first plurality of optical fibers and having said first end outwardly apertured through said convex surface, said second plurality of optical fibers divided into a multiplicity of subgroups, a predetermined multiple number of said second optical fibers included within each subgroup, said multiple number equalling a number of discrete wavelengths; and
   a plurality of photodetector means for identifying a corresponding predetermined wavelength of incident optical radiation, said second ends of each of said second optical fibers selectively disposed in an optically communicating relationship with respect to said plurality of photodetector means, one of said second optical fibers from one of each of said subgroups optically communicating with a corresponding one of said plurality of photodetector means, the number of said plurality of photodetector means equalling said number of discrete wavelengths,
   whereby the spectrum of said incident optical radiation is determined.

4. The apparatus of claim 1 further comprising:
   a second plurality of optical fibers disposed in said mounting means, said second plurality optical fibers each having a first and second end, said first end being selectively disposed about said convex surface among said first plurality of optical fibers and having said first end outwardly apertured through said convex surface, said second plurality of optical fibers divided into a multiplicity of subgroups, a predetermined multiple number of said second optical fibers included within each subgroup, said multiple number equalling a number of discrete wavelengths; and
   socket means for defining a rectilinear array of said second ends of said plurality of second optical fibers, said socket means being coupled to said second ends of said second optic fibers, said socket means characterized by a longitudinal axis, said array of said second ends arranged in rows and columns, said rows lying in the direction of said longitudinal axis, each one of said multiple number of optic fibers within each subgroup being linearly disposed within in a corresponding single row at a different position along the direction of said row in the direction of said longitudinal axis;

an optical bandpass wedge filter disposed next to said socket means and in optical communication therewith, said optical bandpass wedge filter permitting passage of optical radiation having a selected wavelength substantially at a single longitudinal postion along a longitudinal axis of said filter, all wavelengths outside said selected range being substantially attenuated at said single longitudinal position of said filter, a predetermined range of wavelengths being selectively transmitted through said filter at different longitudinal positions along said longitudinal axis of said filter, said longitudinal axis of said filter being aligned with said longitudinal axis of said socket means; and photodetector means disposed next to said optical bandpass wedge filter and in optical communication therewith, said photodetector means comprising a plurality of photodetector elements arranged in a rectilinear array corresponding to said array of said second optic fibers within said socket means, said photodetector elements thus being arranged into a plurality of columns corresponding to said columns of said second optic fibers within said socket means, whereby each column of said photodetector means is selectively exposed to a predetermined narrow wavelength inteval of said incident optical radiation depending upon said apparatus so that the spectrum of said incident optical radiation is determined.

5. The apparatus of claim 4 wherein each said row within said socket means corresponds to a selected one of said plurality of subgroups of second optic fibers, each subgroup of second optic fibers corresponding to a predetermined spacial direction, whereby said incident optical radiation may impinge upon said apparatus from a plurality of directions with a corresponding plurality of spectrums and wherein said evaluating circuit means generates an output signal identifying said selected spacial direction with each corresponding spectrum.

6. The apparatus of claim 1 wherein said evaluating circuit means generates an output signal corresponding to spacial orientation of said direction of said incident optical radiation by interpolation of said intensity output signals from adjacent detector elements within said detector matrix.

7. The apparatus of claim 1 wherein said summing network means adds a currently detected value of said intensity output signal for each detector element of said detector matrix to previously stored values of said corresponding intensity output signal as stored within said corresponding memory location within said intensity memory means, said intensity memory means restoring said summed value generated by said summing network means back into said corresponding memory location within said intensity memory means, whereby intensity magnification of said incident optical radiation is accomplished.

* * * * *